United States Patent
Pulli

(10) Patent No.: US 9,767,538 B2
(45) Date of Patent: Sep. 19, 2017

(54) TECHNIQUE FOR DEBLURRING IMAGES

(71) Applicant: NVIDIA CORPORATION, Santa Clara, CA (US)

(72) Inventor: Kari Pulli, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 52 days.

(21) Appl. No.: 14/018,362

(22) Filed: Sep. 4, 2013

(65) Prior Publication Data

US 2015/0063695 A1   Mar. 5, 2015

(51) Int. Cl.
  *G06K 9/40*   (2006.01)
  *G06T 5/00*   (2006.01)
  *G06T 7/215*  (2017.01)

(52) U.S. Cl.
  CPC ............. *G06T 5/003* (2013.01); *G06T 7/215* (2017.01); *G06T 2207/20201* (2013.01)

(58) Field of Classification Search
  CPC ........... G06T 5/003; G06T 2207/20201; G06T 2207/10016; G06T 5/50; G06T 7/2006; G06T 7/2073
  See application file for complete search history.

(56) References Cited

U.S. PATENT DOCUMENTS

| | | | |
|---|---|---|---|
| 6,879,735 B1 * | 4/2005 | Portniaguine | G06T 5/20 382/261 |
| 8,249,377 B1 | 8/2012 | Banner et al. | |
| 8,810,663 B2 * | 8/2014 | Lin | H04N 5/2355 348/208.12 |
| 2005/0047672 A1 | 3/2005 | Ben-Ezra et al. | |
| 2006/0232712 A1 * | 10/2006 | Zhou et al. | 348/701 |
| 2008/0030587 A1 | 2/2008 | Helbing | |
| 2009/0060373 A1 | 3/2009 | Perera et al. | |
| 2010/0118156 A1 * | 5/2010 | Saito | 348/208.6 |
| 2010/0246989 A1 | 9/2010 | Agrawal et al. | |

OTHER PUBLICATIONS

S Cho, Y Matsushita, S Lee—Computer Vision, 2007. ICCV 2007. IEEE 11th . . . , 2007.*
S Cho, Y Matsushita, S Lee—"Removing Non-Uniform Motion Blur from Images"—Computer Vision, 2007. ICCV 2007. IEEE 11th, 2007.*
International Search Report and Written Opinion dated Nov. 26, 2014, Application No. PCT/US14/53899, 19 pages.

* cited by examiner

*Primary Examiner* — Bhavesh Mehta
*Assistant Examiner* — Ian Lemieux
(74) *Attorney, Agent, or Firm* — Artegis Law Group, LLP

(57) ABSTRACT

An image capture application captures a sequence of images via a digital camera. The sequence of images may have undesirable levels of blurriness due to the motion of objects in the field of view of the digital camera or due to movement of the digital camera itself. A deblur engine within the image capture application generates image segments within one of the captured images, where a given image segment includes pixel values that move coherently between different images in the sequence. The deblur engine then deblurs each image segment based on the coherent motion of each different image segment and combines the resultant, deblurred image segments into a deblurred image. Advantageously, blurriness caused by the combined effects of moving objects and camera motion may be reduced, thereby improving the ability of a digital camera to provide high-quality images. As such, the user experience of digital photography may be enhanced.

22 Claims, 7 Drawing Sheets

TECHNIQUE FOR DEBLURRING IMAGES

BACKGROUND OF THE INVENTION

Field of the Invention

Embodiments of the present invention relate generally to image processing and, more specifically, to a technique for deblurring images.

Description of the Related Art

Interest in digital photography has risen dramatically over the past decade due, in part, to the incorporation of digital video cameras into cell phones and other portable computing devices. However, handheld "point and shoot" cameras, such as those found in these portable devices, oftentimes produce images that are blurry. Some existing methods try to estimate the amount and type of the blur and invert the blurring process, but such blind deconvolution approaches are often unstable. Another existing solution to this problem that can be more robust is to capture two images, the intended image (a long exposure) and a short exposure, and if the intended image is blurred, to then deblur the long exposure based on the short exposure. Even if the short exposure is noisy it can provide useful guidance for unblurring the longer, blurry but otherwise better exposure.

The above approach provides reasonable results when the source of the blurriness is camera motion. However, blurriness is often caused by multiple unrelated factors. In particular, objects within the field of view of the camera may be moving, while, simultaneously, the camera itself may be moving. If the deblurring method assumes that the whole image is blurred the same way, the results will be disappointing. Existing approaches fail to distinguish one type of motion from another and therefore cannot deblur a majority of images effectively.

Accordingly, what is needed in the art is an improved technique for deblurring an image that is blurry due to different types of motion.

SUMMARY OF THE INVENTION

One embodiment of the present invention sets forth a computer-implemented method for generating an image, including capturing a sequence of images that includes a first image and a second image, generating a first image segment within the first image that represents a first group of real-world objects, generating a first motion estimate for the first image segment relative to a region in the second image that corresponds to the first image segment, performing a first deblurring operation based on the first motion estimate to generate a first deblurred image segment, and generating a deblurred version of the first image based on the first deblurred image segment.

One advantage of the disclosed technique is that blurriness caused by the combined effects of moving objects and camera motion may be reduced, thereby improving the ability of a digital camera to provide high-quality images. As such, the user experience of digital photography may be enhanced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
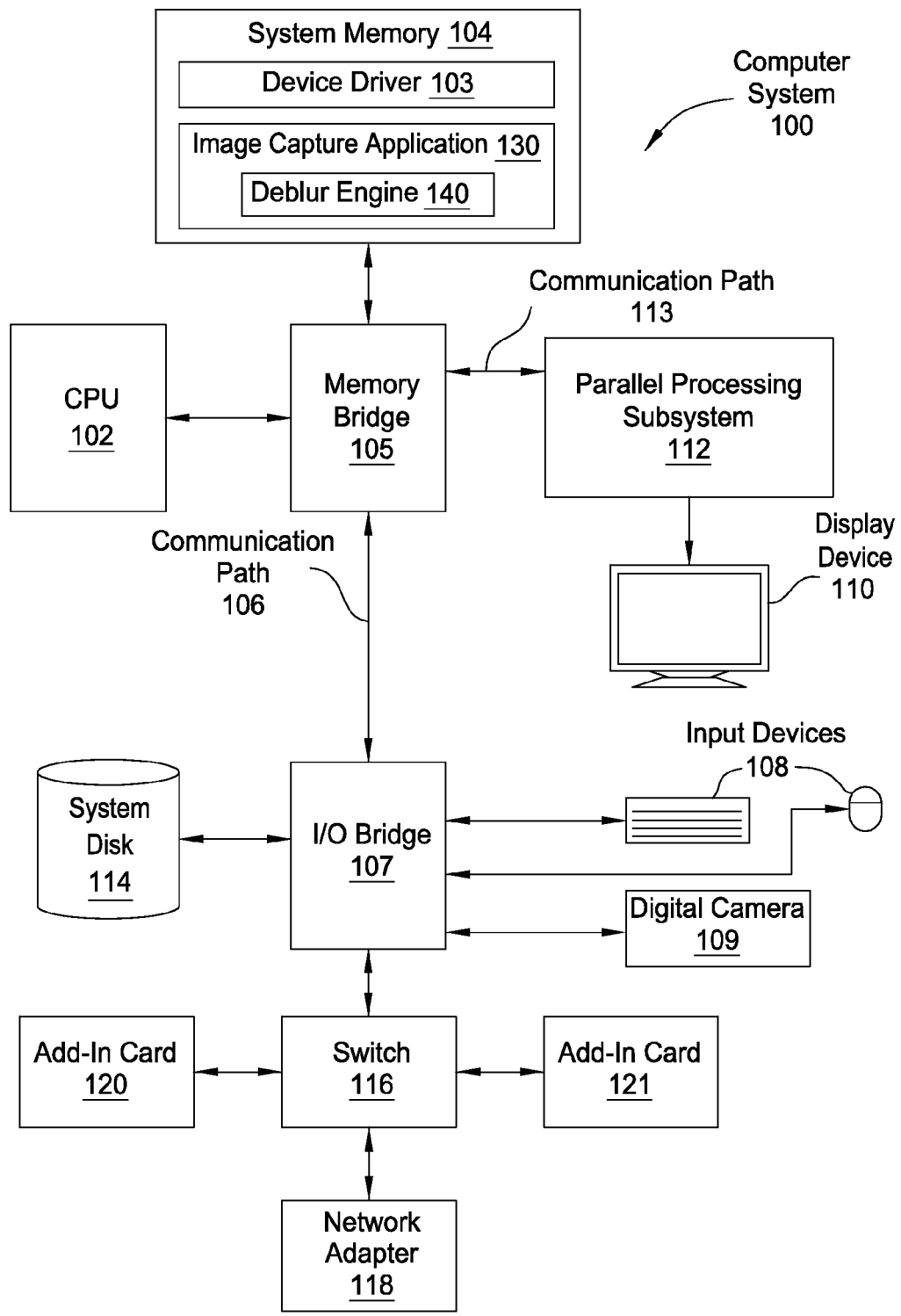
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse or a touch display, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In one embodiment, system memory 104 also includes an image capture application 130 that, in turn, includes a deblur engine 140. When executed by CPU 102 and/or various PPUs within parallel processing subsystem 112, image capture application 130 causes digital camera 109 to capture a sequence of digital images. In the embodiment described herein, computer system 100 may be included within a portable computing device configured to capture and record digital images and video, such as a digital video camera, tablet computer, and so forth. Once the sequence of digital images has been captured and stored to memory (e.g., system memory 104 or another memory unit), deblur engine 140 implements a deblurring process whereby a single image is generated from the various images in the sequence. That single image may have a decreased amount of blurriness compared to other images in the sequence. The deblurring process implementing by deblur engine 140 is described in greater detail below in conjunction with FIGS. 3-7.

In various embodiments, parallel processing subsystem 112 may be integrated with one or more other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
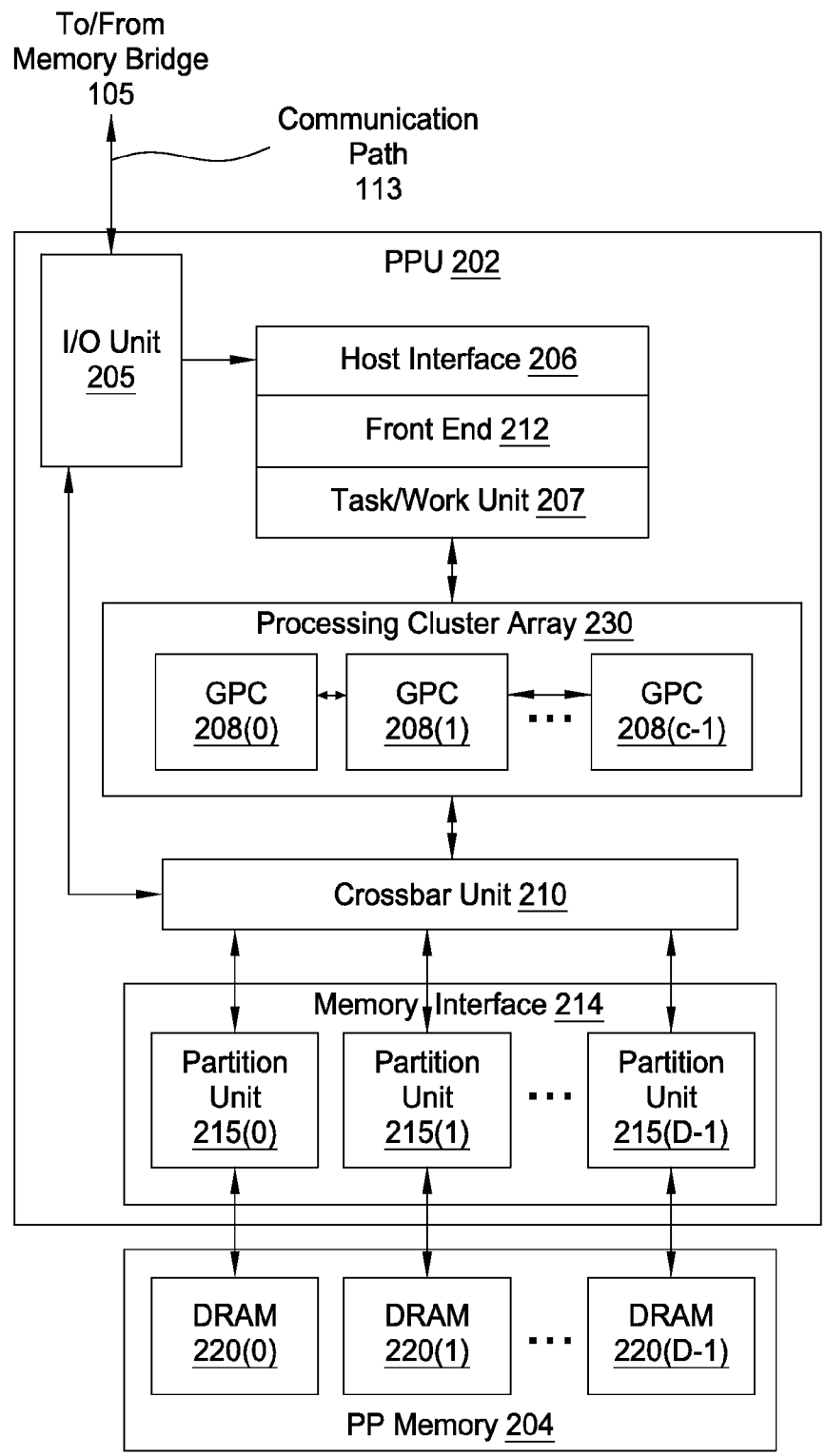
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Technique for Deblurring Blurry Images

As mentioned above in conjunction with FIG. 1, image capture engine 130 within system memory 104 is configured to capture digital images via digital camera 109. Digital camera 109 could be, for example, a set of optical components included within the form factor of a portable device, such as a cell phone. Image capture engine 130 is configured to implement deblur engine 140 to generate images with reduced blurriness.

In practice, image capture application 130 captures two or more images over a short time interval, such as, e.g. 1/10 or 1/100 of a second. The exposure duration of the first image is computed to capture a suitable amount of light to make a well-exposed image, but that may result in an exposure time where the camera and/or scene objects have time to move enough to create a blurry image. If a second image is captured immediately, it may be possible to detect, by comparing the images, how each image area in the first image became blurred. Deblur engine 140 then compares those images to one another to identify groups of objects moving across the field of view of digital camera 109. Deblur engine 140 may also identify the background of those images as an object in motion, where that motion results from movement of digital camera 109. Deblur engine 140 then deblurs one of the captured images by deblurring portions of that image associated with each identified group of objects. The resulting deblurred image may have reduced blurriness compared to the images originally captured by capture application 140. The deblurring process described thus far is described in greater detail below in conjunction with FIG. 3.

Figure 3:
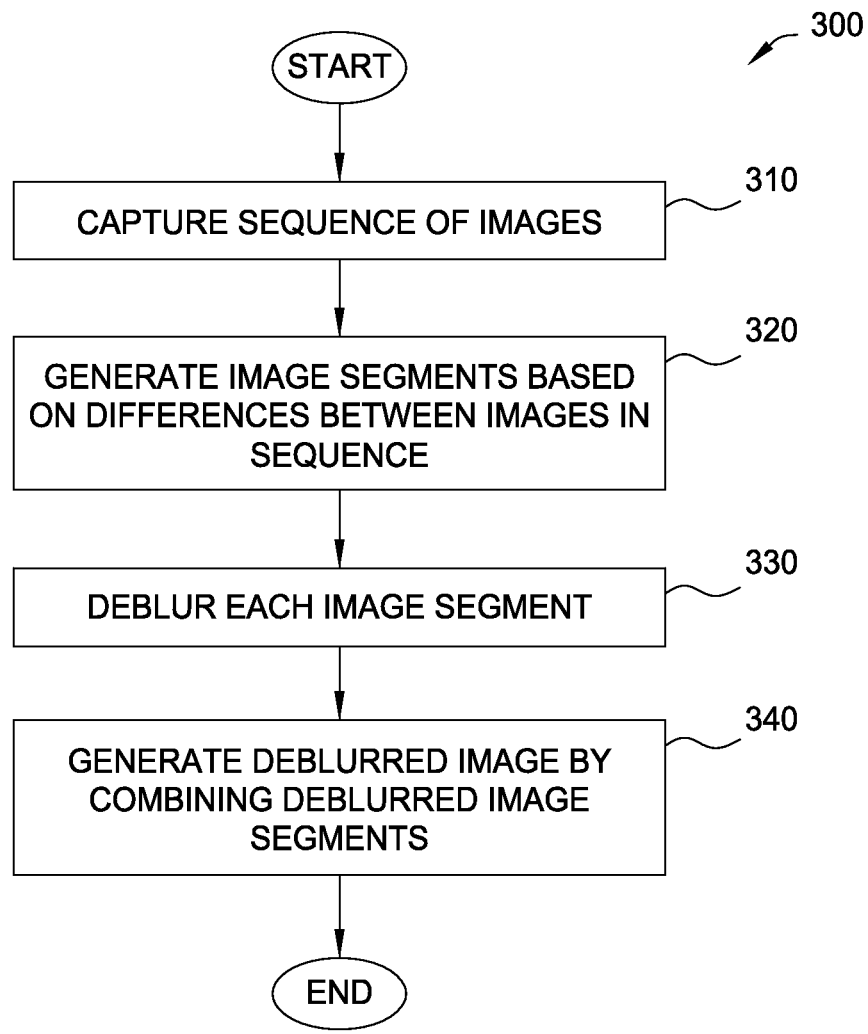
FIG. 3 is a flow diagram of method steps for deblurring a blurry image, according to one embodiment of the present invention.

FIG. 3 is a flow diagram of method steps for deblurring a blurry image, according to one embodiment of the present invention. Although the method steps are described in conjunction with the systems of FIGS. 1-2, persons skilled in the art will understand that any system configured to perform the method steps, in any order, is within the scope of the present invention.

As shown, a method 300 begins at step 310, where image capture application 130 captures a sequence of images. Image capture application 130 is configured to interact with digital camera 109 in order to capture the sequence of images. Each image in the sequence may be captured according to similar capture parameters or different capture parameters. For example, each image in the sequence could be captured with the same or different exposure times, among other parameters.

Image capture application 130 may capture any number of images over any time period, although in practice, image capture application 130 captures at least two images over a short time period (e.g. 1/10 or 1/100 of a second). After performing step 310, image capture application 130 may store the sequence of images in memory or otherwise make those images available to deblur engine 140. Step 310 of the method 300 is described by way of example below in conjunction with FIG. 4.

At step 320, deblur engine 140 generates image segments within one of the images in the sequence based on differences between each image in the sequence. More specifically, deblur engine 140 compares pixel values within one image in the sequence of images to pixel values in a previous image in the sequence. Deblur engine 140 may then identify pixel values that change locations between the two images. Deblur engine 140 is configured to group together pixel values that change locations coherently and identify each group as a unique segment. A given segment may correspond to a group of objects in the field of view of the camera, or to a background region in that field of view.

Deblur engine 140 may also implement techniques associated with the field of computer vision to generate image segments at step 320. For example, deblur engine 140 could generate a velocity vector field within a given image in the sequence by tracking the movements of pixel values between images in the sequence. Deblur engine 140 could then identify an image segment as a region of the given image that includes velocity vectors having approximately equal magnitude and approximately equal direction. Generally speaking, a given image segment includes one or more objects that exhibit similar movements. Step 320 of the method 300 is described by way of example in conjunction with FIG. 5.

At step 330, deblur engine 140 deblurs each image segment generated at step 320. Deblur engine 140 deblurs a given image segment by estimating the linear motion associated with the image segment during the exposure and then deblurring the image segment based on that estimate. In one embodiment, deblur engine 140 estimates the linear motion of the image segment by averaging, or otherwise combining, the velocity vectors of the pixels in that segment. The linear motion estimated in this fashion generally reflects a particular directionality within the plane of the image. Deblur engine 140 may then generate a blur kernel for the image segment based on the fraction of the estimated linear motion to which blurriness in the segment may be reasonably attributed. That fraction could reflect other sources of blurriness, such as incorrect image focus, and so forth. Deblur engine 140 is configured to implement a non-blind deblurring operation with the pixels in the image segment based on the blur kernel generated for that segment. With this approach, deblur engine 140 generates just one blur kernel for the image segment as a whole.

In another embodiment, deblur engine 140 may compute a different blur kernel for each different pixel in the image segment based on the different linear motions of those individual pixels. Deblur engine 140 may estimate the linear motion of a given pixel based on the velocity vector field discussed above, and then generate a blur kernel for the pixel based on that linear motion estimate. Deblur engine 140 may also compare the relative motions of the pixels within the image segment in order to determine the type and extent of blurriness caused by the relative motions of just those pixels in the segment. Deblur engine 140 may then generate a blur kernel for each different pixel in the segment to reflect those potentially different types and amounts of blurriness. Deblur engine 140 then implements non-blind deblurring, similar to that described above, for each different pixel with the corresponding blur kernel. Step 330 of the method 300 is described by way of example in conjunction with FIGS. 6A-6C.

At step 340, deblur engine 140 generates a deblurred image by combining the deblurred image segments generated at step 340. Deblur engine 140 may implement any technically feasible approach for combining portions of an image together to construct an image, including, for example, superposition, among other techniques. The resulting deblurred image may have a decreased amount of blurriness compared to the different images in the sequence initially captured by image capture application 130. Step 340 is described in greater detail below in the example of FIG. 7. After step 340, the method 300 ends.

By implementing the method 300, image capture application 140 and deblur engine 140 may account for blurriness caused by objects traversing the field of view of digital camera 109 as well as blurriness caused by motion of digital camera 109 itself. In addition, deblur engine 140 may implement steps 320, 330, and 340 of the method 300 within each individual image segment in order to further reduce blurriness associated with objects that include moving parts or elements. For example, the body of a person running across the field of view of digital camera 109 moves coherently relative to digital camera 109, while the arms and legs of that person move coherently relative to the person. Deblur engine 140 could identify an image segment that includes the whole person, then identify image sub-segments within that segment that include the arms and legs of the person. Deblur engine 140 could then deblur the image segment and the image sub-segments separately.

As a general matter, deblur engine 140 may implement steps 320, 330, and 340 recursively in order to deblur portions and sub-portions of an image.

The technique described thus far is described in greater detail below in conjunction with FIGS. 4-7. Persons skilled in the art will recognize that the example described hereinafter is presented for illustrative purposes only and in no way limits the scope of the invention.

Figure 4:
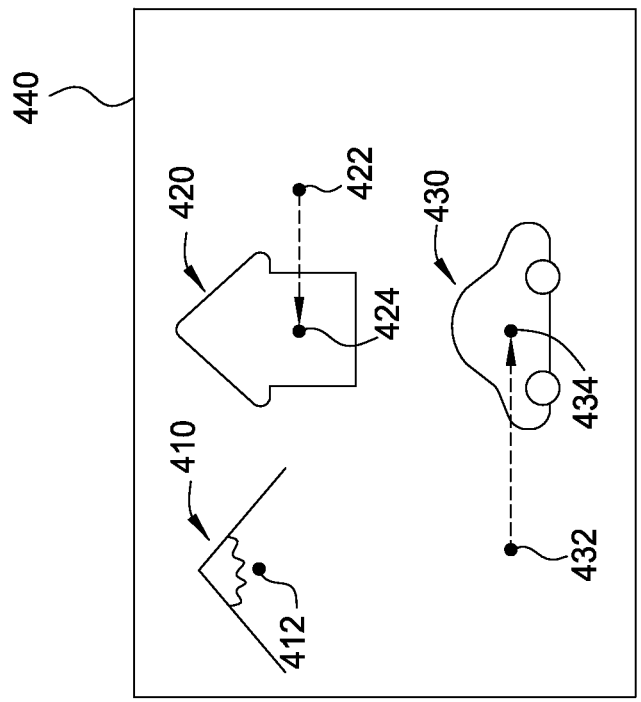
FIG. 4 is a conceptual diagram illustrating exemplary images captured by the computer system of FIG. 1, according to one embodiment of the present invention.
Figure 4:
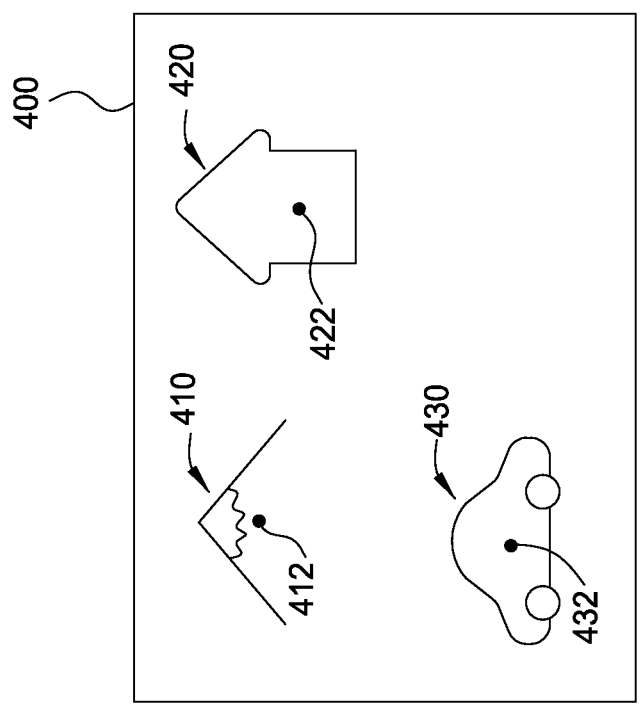

FIG. 4 is a conceptual diagram illustrating exemplary images 400 and 440 captured by digital camera 109 of FIG. 1, according to one embodiment of the present invention. Images 400 and 440 represent an example of a sequence of images that may be captured by image capture application 140 when performing step 310 of the method 300. Images 400 and 440 may be captured with similar or different capture parameters, and may be captured over any time interval. In practice, image capture engine 130 capture images 400 and 440 over a short time interval, such as 1/10 or 1/100 of a second.

As shown, image 400 includes different objects that reside at specific positions within image 400, including a mountain 410 that resides at a position 412, a house 420 that resides at a position 422, and a car 430 that resides at a position 432. Image 440 includes those same objects, however, some of those objects have changed positions within image 440 relative to image 400. House 420 has moved from position 422 within image 400 to position 424 within image 440. Likewise, car 430 has moved from position 432 within image 400 to position 434 within image 440.

The objects within images 400 and 440 may change positions within those images for a variety of reasons. For example, car 430 could actually move from one real-world position to another. House 420 could reside at the same real-world position, however, due to motion of digital camera 109, house 420 could appear within image 440 at a different position than the position where house 420 appeared within image 400. Mountain 410 could reside far away from the real-world position of digital camera 109, and so mountain 109 would not appear to move with respect to other background objects that are also sufficiently far away. Deblur engine 140 is configured to identify image segments within image 440 that may include real-world objects within that image, as described in greater detail below in conjunction with FIG. 5.

Figure 5:
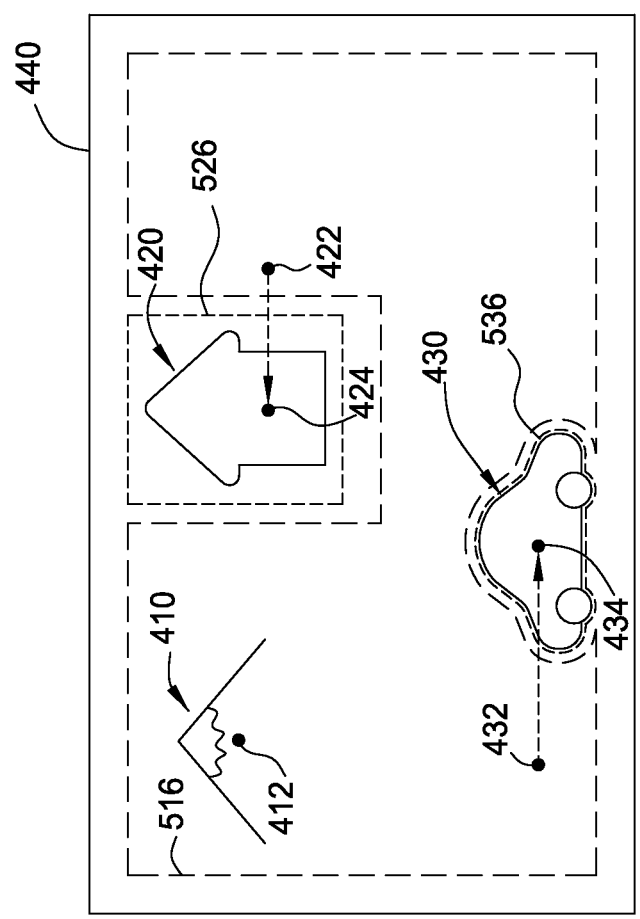
FIG. 5 is a conceptual diagram illustrating exemplary image segments derived from the images of FIG. 4, according to one embodiment of the present invention.

FIG. 5 is a conceptual diagram illustrating exemplary image segments 516, 526, and 536 derived from images 400 and 440 of FIG. 4, according to one embodiment of the present invention. Image segments 516, 526, and 536 represent exemplary image segments generated by deblur engine 140 when performing step 320 of the method 300.

As shown, image segment 516 includes mountain 410 and various other portions of image 440. Image segment 526 includes house 420 and portions of image 440 adjacent to house 420, and image segment 536 just includes car 430 and does not include portions of image 440 immediately surrounding car for reasons discussed in greater detail below. Deblur engine 140 is configured to generate image segments 516, 526, and 536 by comparing pixel values found in image 440 to pixel values found in image 400. Deblur engine 140 may then identify pixel values that moved from one position in image 400 to another position in image 440. Such a pixel value could be associated with car 430 moving from position 432 to position 434, for example. Deblur engine 140 may then group together pixel values that move coherently between images 400 and 440. Returning to the above example, deblur engine 140 could identify all pixel values associated with car 430 that move in the same direction (i.e. the direction from position 432 and 434). Generally, deblur engine 140 may group pixels associated with objects residing at a given distance. For example, deblur engine 140 could group portions of image 440 associated with the ground nearby house 420 into image segment 526, but not group faraway objects into that segment.

Deblur engine 140 may implement the approach described above by generating a velocity vector field within image 440 by tracking the movements of pixel values between images 400 and 440. Deblur engine 140 may then identify a given image segment as a region of image 440 that includes similar velocity vectors. Returning to above example yet again, deblur engine 140 could generate velocity vectors for the pixel values associated with car 430, where those velocity vectors would have a magnitude similar to the distance between positions 432 and 434 and a left-to-right directionality. Deblur engine 140 could then generate segment 536 to include pixel values in image 440 associated with velocity vectors having approximately that magnitude and directionality.

Typically, image segments that include moving objects with a high degree of motion relative to other objects within image 440 may not include portions of image 440 residing adjacent to those moving objects. For example, image segment 536 would only include car 430 and would not include portions of image 440 adjacent to car 430. In addition, image segments that include moving objects with a low degree of motion relative to other objects within image 440 may include portions of image 440 residing adjacent to those moving objects, as would be the case with house 420, as mentioned above. In general, the velocity vector field associated with image 440 may change quickly or slowly along given dimensions, depending on the relative motion of the objects within image 440. Moreover, the various image segments may be generated based on those gradients, and so the associated image segments may include individual objects with similar velocity vectors or portions of image 440 with similar velocity vectors.

Upon generating image segments 516, 526, and 536, deblur engine 140 then deblurs each such image segment, as described in greater detail below in conjunction with FIGS. 6A-6C.

Figure 6A:
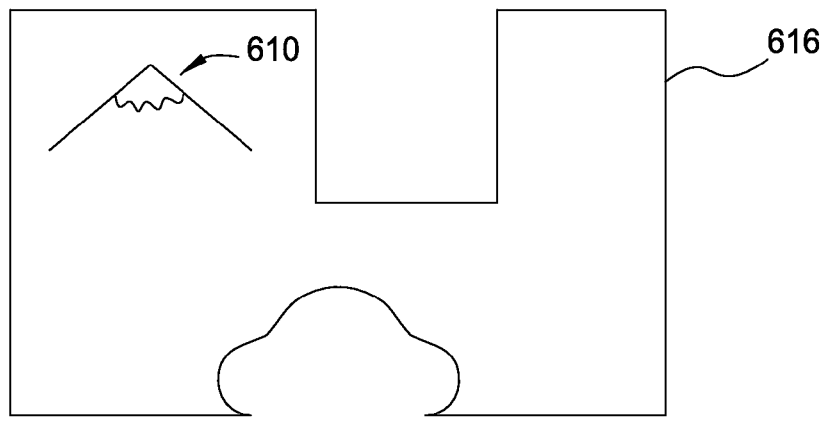
FIGS. 6A-6C are conceptual diagrams illustrating different exemplary deblurred image segments, according to one embodiment of the present invention.

FIG. 6A is a conceptual diagram illustrating an exemplary deblurred image segment 616, according to one embodiment of the present invention. Deblurred image segment 616 may be generated when deblur engine 140 performs step 330 of the method 300. As shown, deblurred image segment 616 includes a mountain 610. Mountain 610 represents a deblurred version of mountain 410 within image 440. Deblur engine 140 also deblurs the other image segments within image 440, as described in greater detail below in conjunction with FIGS. 6B-6C.

Figure 6B:
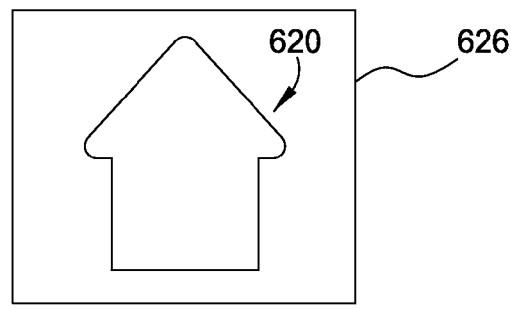

FIG. 6B is a conceptual diagram illustrating an exemplary deblurred image segment 626, according to one embodiment of the present invention. Deblurred image segment 626 may also be generated when deblur engine 140 performs step 330 of the method 300. As shown, deblurred image segment 626 includes a house 620. House 620 represents a deblurred version of house 420 within image 440.

Figure 6C:
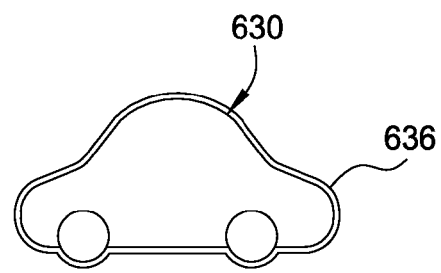

FIG. 6C is a conceptual diagram illustrating an exemplary deblurred image segment 636, according to one embodiment of the present invention. Deblurred image segment 636 may also be generated when deblur engine 140 performs step 330 of the method 300. As shown, deblurred image segment 636 includes a car 630. Car 630 represents a deblurred version of car 430 within image 440.

Referring collectively to FIGS. 6A-6C, deblur engine 140 deblurs a given image segment by estimating the linear motion associated with the image segment during the exposure and then deblurring the image segment based on that estimate. In one embodiment, deblur engine 140 estimates the linear motion of the image segment by averaging, or otherwise combining, the velocity vectors of the pixels in that segment. The linear motion estimated in this fashion generally reflects a particular directionality within the plane of image 440. Deblur engine 140 may then generate a blur kernel for the image segment based on the fraction of the estimated linear motion to which blurriness in the segment may be reasonably attributed. That fraction could reflect other sources of blurriness, such as image focus, and so forth. Deblur-engine 140 is configured to implement a non-blind deblurring operation with the pixels in the image segment based on the blur kernel generated for that segment. With this approach, deblur engine 140 generates just one blur kernel for the image segment as a whole.

In another embodiment, deblur engine 140 may compute a different blur kernel for each different pixel in the image segment based on the different linear motions of those individual pixels. Deblur engine 140 may estimate the linear motion of a given pixel based on the velocity vector field discussed above, and then generate a blur kernel for the pixel based on that linear motion estimate. Deblur engine 140 may also compare the relative motions of the pixels within the image segment in order to determine the type and extent of blurriness caused by the relative motions of just those pixels within the segment. Deblur engine 140 may then generate a blur kernel for each different pixel in the segment to reflect those potentially different types and amounts of blurriness. Deblur engine 140 then implements non-blind deblurring, similar to that described above, for each different pixel with the corresponding blur kernel.

Once image segments 616, 626, and 636 have been deblurred via one of the approaches described above, deblur engine 140 then combines image segments 616, 626, and 636 into a final, deblurred image, as described in greater detail below in conjunction with FIG. 7.

Figure 7:
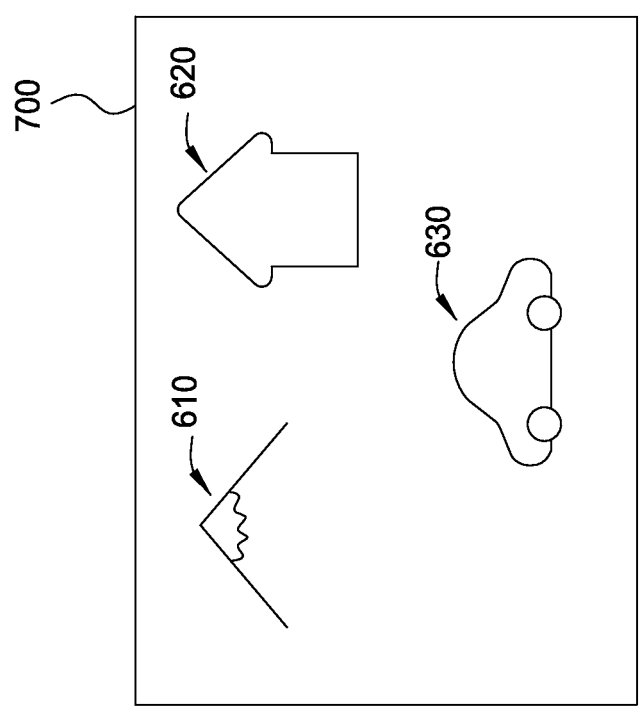
FIG. 7 is a conceptual diagram illustrating an exemplary deblurred image, according to one embodiment of the present invention.

FIG. 7 is a conceptual diagram illustrating an exemplary deblurred image 700, according to one embodiment of the present invention. Deblurred image 700 may be generated when deblur engine 140 performs step 340 of the method 300. As shown, deblurred image 700 includes mountain 610, house 620, and car 630. Deblur engine 140 may generate deblurred image 700 by superimposing deblurred image segments 616, 626, and 636 shown in FIGS. 6A, 6B, and 6C, respectively.

Persons skilled in the art will understand that FIGS. 4-7 represent just one exemplary application of the method 300 described in conjunction with FIG. 3, and that the method 300 may be applied to any sequence of images having any number of objects. In addition, persons skilled in the art will recognize that the techniques described herein may be implement by software, such as image capture application 140 and deblur engine 130, or by hardware that implements similar functionality. Further, any combination of software and hardware that implements the method 300 also falls within the scope of the invention.

In sum, an image capture application captures a sequence of images via a digital camera. The sequence of images may have undesirable levels of blurriness due to the motion of objects in the field of view of the digital camera or due to movement of the digital camera itself. A deblur engine within the image capture application generates image segments within one of the captured images, where a given image segment includes pixel values that move coherently between different images in the sequence. The deblur engine then deblurs each image segment based on the coherent motion of each different image segment and combines the resultant, deblurred image segments into a deblurred image.

Advantageously, blurriness caused by the combined effects of moving objects and camera motion may be reduced, thereby improving the ability of a digital camera to provide high-quality images. As such, the user experience of digital photography may be enhanced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for generating an image, the method comprising:
    capturing a sequence of images that includes a first image and a second image;
    selecting a first image segment within the first image that represents a first group of real-world objects based on a comparison of the first image and the second image;
    generating a first motion estimate for a first portion of the first image segment and a second motion estimate for a second portion of the first image segment relative to a region in the second image that corresponds to the first image segment;
    performing a first deblurring operation on the first portion of the first image segment based on a first blur kernel derived from the first motion estimate to generate a first deblurred portion of the first image segment;
    performing the first deblurring operation on the second portion of the first image segment based on a second blur kernel derived from the second motion estimate to generate a second deblurred portion of the first image segment; and
    generating a deblurred version of the first image by combining the first deblurred portion of the first image segment and the second deblurred portion of the first image segment.

2. The computer-implemented method of claim 1, wherein the comparison of the first image with the second image comprises identifying a first set of pixel values associated with the first image that moves coherently between the first image and the second image, wherein the first set of pixel values corresponds to the first group of real-world objects.

3. The computer-implemented method of claim 2, wherein identifying the first set of pixel values associated with the first image comprises:
    generating a velocity vector field representing the movements of each pixel value between the first image and the second image; and
    grouping together a set of pixel values having velocity vectors of approximately equal magnitude and approximately equal direction to designate as the first set of pixel values.

4. The computer-implemented method of claim 1, wherein performing the first deblurring operation comprises:

estimating the first blur kernel associated with the first portion of the first image segment based on the first motion estimate;

reducing blurriness within the first portion of the first image segment during exposure of the sequence of images based on the first blur kernel.

5. The computer implemented method of claim 4, wherein estimating the first blur kernel comprises:

estimating the velocity of a first pixel value in a first set of pixel values associated with the first image segment relative to other pixel values in the first set of pixel values; and determining an amount of blurriness associated with the first pixel value that is caused by the velocity of the first pixel value.

6. The computer-implemented method of claim 1, further comprising:

generating a second image segment within the first image that represents a second group of real-world objects;

generating a third motion estimate for the second image segment relative to a region in the second image that corresponds to the second image segment;

performing a second deblurring operation based on the third motion estimate to generate a second deblurred image segment; and superimposing the first deblurred portion of the first image segment, the second deblurred portion of the first image segment, and the second deblurred image segment to generate the deblurred version of the first image.

7. The computer-implemented method of claim 6, wherein performing the second deblurring operation comprises:

estimating a third blur kernel associated with the second image segment based on the third motion estimate;

reducing blurriness within the second image segment during exposure of the sequence of images based on the third blur kernel.

8. The computer implemented method of claim 7, wherein estimating the third blur kernel comprises:

estimating the velocity of a second pixel value in a second set of pixel values associated with the second image segment relative to other pixel values in the second set of pixel values; and determining an amount of blurriness associated with the second pixel value that is caused by the velocity of the second pixel value.

9. The computer-implemented method of claim 1, wherein the first image and the second image are sequential images.

10. The computer-implemented method of claim 1, further comprising:

determining a first fraction of blur that is attributable to motion associated with the first portion of the first image segment; and generating the first blur kernel based on the first fraction.

11. A non-transitory computer-readable medium storing program instructions that, when executed by a processing unit, cause the processing unit to generate an image by performing the steps of:

capturing a sequence of images that includes a first image and a second image;

selecting a first image segment within the first image that represents a first group of real-world objects based on a comparison of the first image and the second image;

selecting a second image segment within the first image that represents a second group of real-world objects based on a second comparison of the first image and the second image;

generating a first motion estimate for a first portion of the first image segment and a second motion estimate for a second portion of the first image segment relative to a region in the second image that corresponds to the first image segment;

generating a third motion estimate for a first portion of the second image segment and a fourth motion estimate for a second portion of the second image segment relative to a region in the second image that corresponds to the second image segment;

performing a first deblurring operation on the first portion of the first image segment based on a first blur kernel derived from the first motion estimate to generate a first deblurred portion of the first image segment;

performing the first deblurring operation on the second portion of the first image segment based on a second blur kernel derived from the second motion estimate to generate a second deblurred portion of the first image segment;

performing a second deblurring operation on the first portion of the second image segment based on a third blur kernel derived from the third motion estimate to generate a first deblurred portion of the second image segment;

performing the second deblurring operation on the second portion of the second image segment based on a fourth blur kernel derived from the fourth motion estimate to generate a second deblurred portion of the second image segment; and combining the first deblurred portion of the first image segment, the second deblurred portion of the first image segment, the first deblurred portion of the second image segment, and the second deblurred portion of the second image segment to generate a deblurred version of the first image.

12. The non-transitory computer-readable medium of claim 11, wherein the comparison of the first image with the second image comprises identifying a first set of pixel values associated with the first image that moves coherently between the first image and the second image, wherein the first set of pixel values corresponds to the first group of real-world objects.

13. The non-transitory computer-readable medium of claim 12, wherein the step of identifying the first set of pixel values associated with the first image comprises:

generating a velocity vector field representing the movements of each pixel value between the first image and the second image; and grouping together a set of pixel values having velocity vectors of approximately equal magnitude and approximately equal direction to designate as the first set of pixel values.

14. The non-transitory computer-readable medium of claim 11, wherein the step of performing the first deblurring operation comprises:

estimating the first blur kernel associated with the first portion of the first image segment based on the first motion estimate;

reducing blurriness within the first portion of the first image segment during exposure of the sequence of images based on the first blur kernel.

15. The non-transitory computer-readable medium of claim 14, wherein estimating the first blur kernel comprises:

estimating the velocity of a first pixel value in a first set of pixel values associated with the first image segment relative to other pixel values in the first set of pixel values; and determining an amount of blurriness associated with the first pixel value that is caused by the velocity of the first pixel value.

16. The non-transitory computer-readable medium of claim 15, wherein the step of performing the second deblurring operation comprises:

estimating the third blur kernel associated with the first portion of the second image segment based on the third motion estimate;

reducing blurriness within the first portion of the second image segment during exposure of the sequence of images based on the third blur kernel.

17. The non-transitory computer-readable medium of claim 16, wherein estimating the third blur kernel comprises:

estimating the velocity of a second pixel value in a second set of pixel values associated with the second image segment relative to other pixel values in the second set of pixel values; and determining an amount of blurriness associated with the second pixel value that is caused by the velocity of the second pixel value.

18. The non-transitory computer-readable medium of claim 11, wherein the step of combining comprises superimposing the first deblurred portion of the first image segment, the second deblurred portion of the first image segment, the first deblurred portion of the second image segment, and the second deblurred portion of the second image segment.

19. A computing device configured to generate an image, including:

a memory configured to store sequences of images;
a processor coupled to the memory and configured to:
capture a sequence of images that includes a first image and a second image;
select a first image segment within the first image that represents a first group of real-world objects based on a comparison of the first image and the second image;
select a second image segment within the first image that represents a second group of real-world objects based on a second comparison of the first image and the second image;
generate a first motion estimate for a first portion of the first image segment and a second motion estimate for a second portion of the first image segment relative to a region in the second image that corresponds to the first image segment;
generate a third motion estimate for a first portion of the second image segment and a fourth motion estimate for a second portion of the second image segment relative to a region in the second image that corresponds to the second image segment;
perform a first deblurring operation on the first portion of the first image segment based on a first blur kernel derived from the first motion estimate to generate a first deblurred portion of the first image segment;
perform the first deblurring operation on the second portion of the first image segment based on a second blur kernel derived from the second motion estimate to generate a second deblurred portion of the first image segment;
perform a second deblurring operation on the first portion of the second image segment based on a third blur kernel derived from the third motion estimate to generate a first deblurred portion of the second image segment;
perform the second deblurring operation on the second portion of the second image segment based on a fourth blur kernel derived from the fourth motion estimate to generate a second deblurred portion of the second image segment; and
combine the first deblurred portion of the first image segment, the second deblurred portion of the first image segment, the first deblurred portion of the second image segment, and the second deblurred portion of the second image segment to generate a deblurred version of the first image.

20. The computing device of claim 19, wherein the memory stores program instructions that, when executed by the processor, cause the processor to:

capture the sequence of images;
select the first image segment;
select the second image segment;
generate the first motion estimate and the second motion estimate;
generate the third motion estimate and the fourth motion estimate;
perform the first deblurring operation;
perform the second deblurring operation; and
combine the first deblurred portion of the first image segment, the second deblurred portion of the first image segment, the first deblurred portion of the second image segment, and the second deblurred portion of the second image segment to generate a deblurred version of the first image.

21. The computing device of claim 19, wherein in the comparison of the first image and the second image, the processor compares the first image and the second image by identifying a first set of pixel values associated with the first image that moves coherently between the first image and the second image, wherein the first set of pixel values corresponds to the first group of real-world objects.

22. The computing device of claim 21, wherein the processor identifies the first set of pixel values associated with the first image by:

generating a velocity vector field representing the movements of each pixel value between the first image and the second image; and grouping together a set of pixel values having velocity vectors of approximately equal magnitude and approximately equal direction to designate as the first set of pixel values.

* * * * *